US012362117B2

(12) United States Patent
Sato et al.

(10) Patent No.: US 12,362,117 B2
(45) Date of Patent: Jul. 15, 2025

(54) RELAY SYSTEM

(71) Applicant: SUBARU CORPORATION, Tokyo (JP)

(72) Inventors: Tomoya Sato, Tokyo (JP); Akira Uchida, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 141 days.

(21) Appl. No.: 18/368,394

(22) Filed: Sep. 14, 2023

(65) Prior Publication Data

US 2024/0105407 A1 Mar. 28, 2024

(30) Foreign Application Priority Data

Sep. 28, 2022 (JP) ................................ 2022-154305

(51) Int. Cl.
*H01H 47/00* (2006.01)

(52) U.S. Cl.
CPC ................................ *H01H 47/002* (2013.01)

(58) Field of Classification Search
CPC ................ H01H 47/002; H01H 50/28; H01H 2011/0068; H01H 50/12; H01H 2047/025
USPC ........................................................ 361/161
See application file for complete search history.

(56) References Cited

U.S. PATENT DOCUMENTS

| | | | | | |
|---|---|---|---|---|---|
| 4,074,112 | A * | 2/1978 | Runft | H01H 1/60 | 200/239 |
| 2003/0163999 | A1* | 9/2003 | Bennett | F25D 21/002 | 62/186 |
| 2007/0278200 | A1* | 12/2007 | Muromachi | H05B 3/86 | 219/203 |
| 2012/0193338 | A1* | 8/2012 | Sullivan | B60S 1/66 | 219/202 |
| 2014/0340808 | A1* | 11/2014 | Kurita | H01H 47/002 | 361/170 |
| 2021/0183602 | A1* | 6/2021 | Kimura | H01H 50/12 | |
| 2022/0130629 | A1* | 4/2022 | Hirayama | H01H 45/12 | |
| 2023/0081030 | A1* | 3/2023 | Karasawa | H02H 5/042 | 340/584 |
| 2024/0100913 | A1* | 3/2024 | Taira | B60H 1/00785 | |
| 2024/0100965 | A1* | 3/2024 | Hirata | B60L 50/30 | |
| 2024/0113360 | A1* | 4/2024 | Kumar | H01M 10/6571 | |

FOREIGN PATENT DOCUMENTS

| | | | | |
|---|---|---|---|---|
| JP | 2011-210385 A | | 10/2011 | |
| JP | 2023078539 A | * | 6/2023 | B60R 16/0231 |

* cited by examiner

*Primary Examiner* — Dharti H Patel
(74) *Attorney, Agent, or Firm* — MCGINN I.P. LAW GROUP, PLLC

(57) ABSTRACT

A relay system includes a relay device and a controller. The relay device includes a contact and a driving mechanism configured to switch the contact between an open mode and a closed mode. The controller is configured to control the relay device. The controller is configured to, when freezing occurs on the contact, to commence first application of electric current to the driving mechanism to generate a driving force acting in a direction in which the contact is not switched between the open mode and a closed mode.

6 Claims, 3 Drawing Sheets

RELAY SYSTEM

CROSS-REFERENCE TO RELATED APPLICATIONS

The present application claims priority from Japanese Patent Application No. 2022-154305 filed on Sep. 28, 2022, the entire contents of which are hereby incorporated by reference.

BACKGROUND

The disclosure relates to relay systems.

Japanese Unexamined Patent Application Publication No. 2011-210385 discloses a relay controller that prevents a contact of a relay device from freezing. The relay controller switches the relay device to an open mode by stopping the application of electric current to a coil, and then continuously applies electric current to the coil to an extent that the relay device does not switch to a closed mode, thereby preventing condensation and freezing from occurring on the contact.

SUMMARY

An aspect of the disclosure provides a relay system including a relay device and a controller. The relay device includes a contact and a driving mechanism configured to switch the contact between an open mode and a closed mode. The controller is configured to control the relay device. The controller is configured to, when freezing occurs on the contact, commence first application of electric current to the driving mechanism to generate a driving force acting in a direction in which the contact is not switched between the open mode and the closed mode.

An aspect of the disclosure provides a relay system including a relay device and circuitry. The relay device includes a contact, and a driving mechanism including coil and configured to switch the contact between an open mode and a closed mode. The circuitry is configured to control the relay device. The circuitry is configured to, when freezing occurs on the contact, commence first application of electric current to the coil of the driving mechanism to generate a driving force acting in a direction in which the contact is not switched between the open mode and the closed mode.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In the relay controller in the related art, since the contact is heated by applying electric current to the coil to an extent that the relay device does not switch between the open and closed modes, it is difficult to apply a large amount of heat to the contact at once. Therefore, in this method, when freezing occurs on the contact, it takes a long period of time until the contact becomes usable again by unfreezing. Assuming that the unfreezing process is performed by applying a large amount of electric current to the coil to an extent that the relay device switches between the open and closed modes, the contact undesirably switches between the open and closed modes when the unfreezing process is completed. This results in limitations on the unfreezing timing, and also shortens the lifespan of the contact.

It is desirable to provide a relay system that suppresses a reduced lifespan of a contact and that can quickly deal with freezing occurring on the contact when such freezing occurs.

The accompanying drawings are included to provide a further understanding of the disclosure and are incorporated in and constitute a part of this specification. The drawings illustrate embodiments and, together with the specification, serve to describe the principles of the disclosure.

Figure 1:
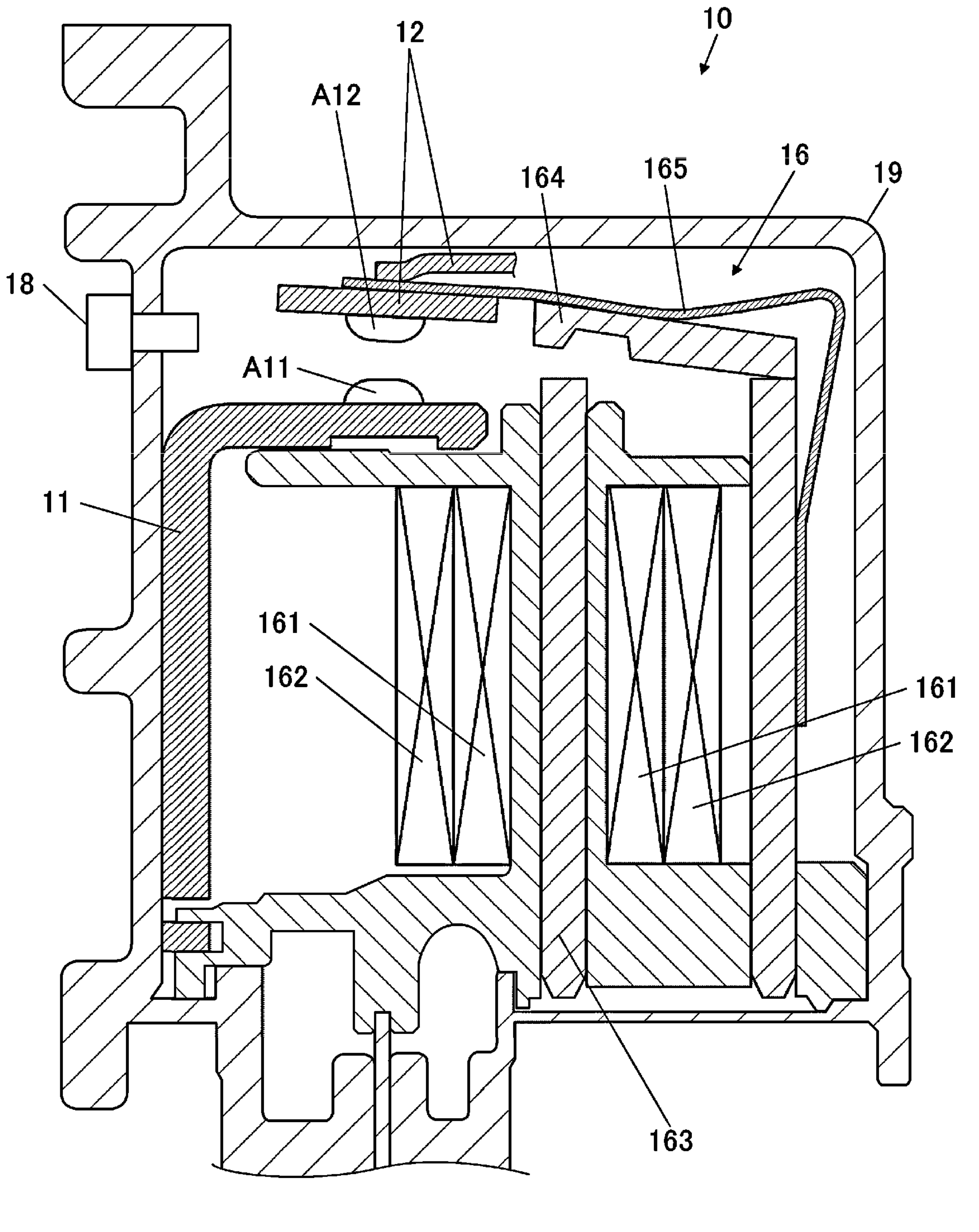
FIG. 1 illustrates the configuration of a relay device according to an embodiment of the disclosure.

FIG. 1 illustrates the configuration of a relay device according to the embodiment of the disclosure. FIG. 1 is a vertical sectional view of a relay device 10, taken along a stationary core 163.

The relay device 10 according to this embodiment is a latching relay. A latching relay is to be supplied with electric current when contacts A11 and A12 are to be switched from an open mode to a closed mode and when the contacts A11 and A12 are to be switched from the closed mode to the open mode. In addition, after the switching to the open or closed mode, the latching relay maintains the open or closed mode even when the application of the electric current is discontinued.

As illustrated in FIG. 1, the relay device 10 includes the pair of contacts A11 and A12 switchable between a separated state and a contact state, first and second terminals (not illustrated) by which one of electric circuits to be opened and closed is coupled to the other one of the electric circuits, a first conductor 11 that electrically couples the contact A11 and the first terminal to each other, and a second conductor 12 that electrically couples the contact A12 and the second terminal to each other. The contact A11 is fixed to a part of the first conductor 11, and the contact A12 is fixed to a part of the second conductor 12. A part of the second conductor 12 is supported in a displaceable manner by a spring member 165. This displacement causes the pair of contacts A11 and A12 to switch between the separated state and the contact state.

The relay device 10 further includes a driving mechanism 16 that moves the pair of contacts A11 and A12 toward or away from each other, a housing 19, and a first temperature sensor 18 that detects the temperature inside the housing 19.

The driving mechanism 16 includes a first coil 161, a second coil 162, the stationary core 163, a movable core 164, the spring member 165, and a latching mechanism (not illustrated). By being supplied with electric current, the first coil 161 and the second coil 162 generates a driving force (magnetic force) that moves the movable core 164 between the stationary core 163 and the movable core 164. By being supplied with electric current, the first coil 161 generates a driving force in a direction for bringing the contacts A11 and A12 adjacent to each other. By being supplied with electric current, the second coil 162 generates a driving force in a direction for separating the contacts A11 and A12 from each other. The aforementioned direction for bringing the contacts A11 and A12 adjacent to each other refers to a direction for switching the contacts A11 and A12 from the open mode to the closed mode. The aforementioned direction for separating the contacts A11 and A12 from each other refers to a direction for switching the contacts A11 and A12 from the closed mode to the open mode. The first coil 161 may be referred to as closed excitation wiring. The second coil 162 may be referred to as open excitation wiring. The latching mechanism maintains the movable core 164 at two positions, that is, a position where the contacts A11 and A12 are in contact with each other and a position where the contacts A11 and A12 are separated from each other.

A terminal of the first coil 161 and a terminal of the second coil 162 are disposed outside the housing 19. Electric current can be applied to the first coil 161 and the second coil 162 via an external terminal.

The first temperature sensor 18 has a detector disposed inside the housing 19 and outputs a detection signal indicating a detected temperature to the outside of the housing 19. The first temperature sensor 18 may be fixed to, for example, the housing 19. The temperature detected by the first temperature sensor 18 is, for example, the temperature of air inside the housing 19. Alternatively, the temperature detected by the first temperature sensor 18 may be the temperature of the first conductor 11 to which the contact A11 is fixed or the temperature of the second conductor 12 to which the contact A12 is fixed.

The housing 19 accommodates the pair of contacts A11 and A12, the first conductor 11, the second conductor 12, and the driving mechanism 16. The housing 19 may be internally sealed. The terminal (first terminal) of the first conductor 11, the terminal (second terminal) of the second conductor 12, the terminal of the first coil 161, and the terminal of the second coil 162 are provided outside the housing 19.

In the relay device 10 having the above-described configuration, when the first coil 161 is supplied with electric current in a state where the pair of contacts A11 and A12 are separated from each other, the movable core 164 and a movable part of the second conductor 12 receive a driving force acting in the direction for bringing the pair of contacts A11 and A12 adjacent to each other. Then, the movable core 164 and the movable part of the second conductor 12 move to bring the contacts A11 and A12 into contact with each other, whereby the relay device 10 switches to the closed mode. In this case, the latching mechanism maintains the movable core 164 and the movable part of the second conductor 12 in position. Subsequently, the relay device 10 is maintained in the closed mode even when the application of the electric current to the first coil 161 is discontinued.

When the second coil 162 is supplied with electric current in a state where the pair of contacts A11 and A12 are near each other, the movable core 164 and the movable part of the second conductor 12 receive a driving force acting in the direction for separating the pair of contacts A11 and A12 from each other. Then, the movable core 164 and the movable part of the second conductor 12 move to separate the contacts A11 and A12 from each other, whereby the relay device 10 switches to the open mode. In this case, the latching mechanism maintains the movable core 164 and the movable part of the second conductor 12 in position. Subsequently, the relay device 10 is maintained in the open mode even when the application of the electric current to the second coil 162 is discontinued.

Relay System

Figure 2:
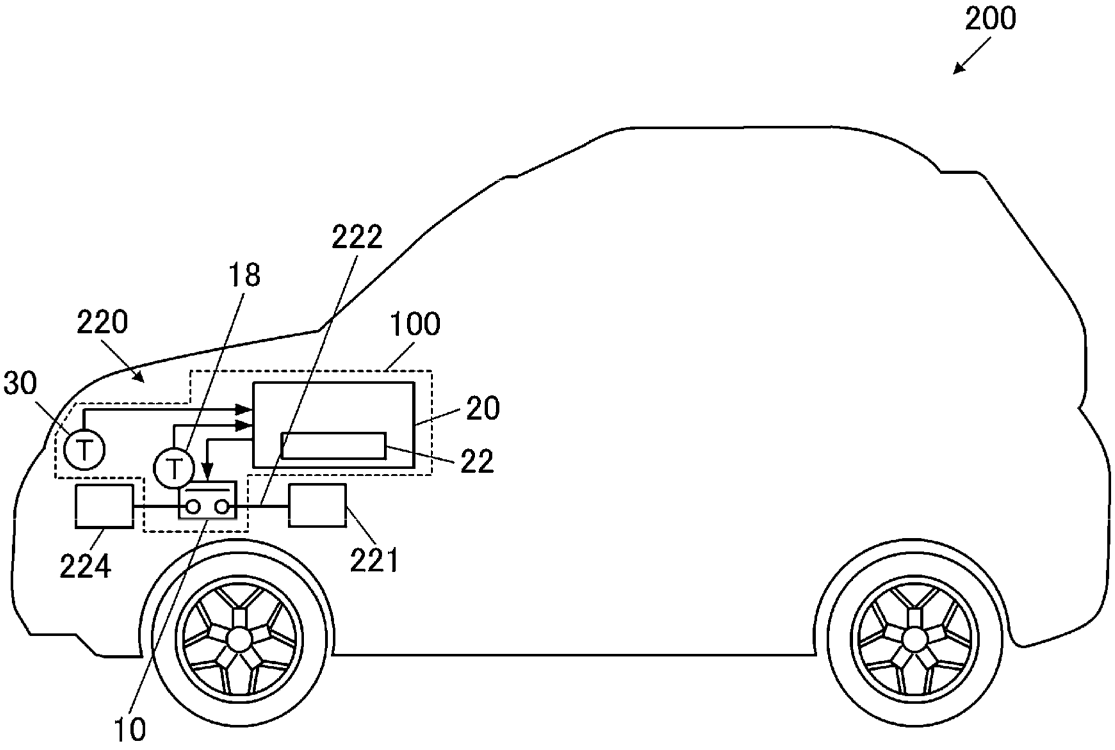
FIG. 2 illustrates a relay system and a power supply device according to an embodiment of the disclosure.

FIG. 2 illustrates a relay system and a power supply device according to an embodiment of the disclosure. A relay system 100 according to this embodiment includes the relay device 10, a controller 20 that controls the relay device 10, and a second temperature sensor 30 that detects the ambient temperature.

The relay system 100 may be applied to a power supply device 220 of a vehicle 200, such as an electric vehicle (EV), a hybrid electric vehicle (HEV), or an engine vehicle. The power supply device 220 includes an electric power supplier 221, such as a battery, a DC/DC converter, or a power generator, an electric power line 222 that delivers electric power from the electric power supplier 221 to an electric device 224, and the relay device 10 that opens and closes an electric circuit of the electric power line 222.

The relay device 10 may be disposed in a power source room, such as an engine room. During the cold season, the power source room may increase in temperature due to driving of a power source, and may rapidly decrease in temperature due to a stoppage of the power source. Moreover, the power source room may be in a harsh temperature environment when the temperature decreases below the freezing point due to a long stoppage of the power source. As time passes, the relay device 10 disposed in the harsh temperature environment may internally receive moisture even if the relay device 10 is internally sealed by the housing 19. When moisture enters the relay device 10, the moisture in the relay device 10 vaporizes as the relay device 10 increases in temperature. Then, heat is extracted from within the relay device 10 via the electric power line 222 having a large heat capacity, so that the first conductor 11 and the second conductor 12 decrease in temperature first, possibly causing condensation to occur in the contacts A11 and A12. Then, when the temperature decreases below the freezing point, freezing occurs on the contacts A11 and A12.

The second temperature sensor 30 is configured to detect an outside air temperature of the vehicle 200 as an ambient temperature. Alternatively, the second temperature sensor 30 may be configured to detect an air temperature in the space (e.g., the power source room) where the relay device 10 is disposed. The second temperature sensor 30 transmits a detection signal indicating the detected temperature to the controller 20.

The controller 20 is an electronic control unit (ECU), has a storage unit 22 storing a control program, and controls the relay device 10 in accordance with the control program. The controller 20 may communicate with a second ECU, such as a controller of the vehicle 200, and perform control for switching the relay device 10 between the open and closed modes based on a request from the second ECU. Furthermore, the controller 20 may be integrated with the second ECU, such as the controller of the vehicle 200.

The function of the controller 20 will now be described. The controller 20 has a function for switching the relay device 10 between the open and closed modes based on a request for switching the relay device 10 between the open and closed modes. The switching between the open and closed modes is performed by applying electric current to the first coil 161 or the second coil 162.

The controller 20 further has a function for performing an estimation related to whether freezing has occurred on the contacts A11 and A12 based on a temperature detected by the first temperature sensor 18 and a temperature detected by the second temperature sensor 30. The estimation related to whether freezing has occurred includes estimating whether freezing has occurred, estimating a possibility of freezing, and estimating whether the possibility has exceeded a certain threshold value. The following description relates to a case where the first temperature sensor 18 detects the air temperature inside the housing 19 and the second temperature sensor 30 detects the outside air temperature. The outside air temperature detected by the second temperature sensor 30 is readily transmitted as the temperature of the contacts A11 and A12 via the electric power line 222. Therefore, based on a difference between the temperature detected by the first temperature sensor 18 and the temperature detected by the second temperature sensor 30, the controller 20 can estimate a possibility of condensation occurring as a result of vaporized moisture within the housing 19 condensing on the contacts A11 and A12. This estimation is possible by preliminarily creating, by simulation or test, a data table in which the aforementioned temperature difference, the detected temperature values, and the value indicating the possibility of condensation are associated with one another, and providing the data table to the controller 20. Furthermore, when the controller 20 estimates that condensation has occurred and the temperatures detected by the first temperature sensor 18 and the second temperature sensor 30 are temperatures that cause the condensation to freeze, the controller 20 can estimate that there is a possibility that freezing has occurred on the contacts A11 and A12.

The temperatures detected by the first temperature sensor 18 and the second temperature sensor 30 are not limited to the above examples. The following description relates to a case where the first temperature sensor 18 detects the temperature of the first conductor 11 or the second conductor 12 in the housing 19, and the second temperature sensor 30 detects the air temperature in the power source room. The air temperature detected by the second temperature sensor 30 in the power source room is close to the air temperature in the housing 19. Therefore, based on a difference between the temperature detected by the first temperature sensor 18 and the temperature detected by the second temperature sensor 30, the controller 20 can estimate a possibility of condensation occurring as a result of vaporized moisture within the housing 19 condensing on the contacts A11 and A12. If there is a possibility of condensation and the temperatures detected by the first temperature sensor 18 and the second temperature sensor 30 are temperatures that cause the condensation to freeze, the controller 20 can estimate that there is a possibility that freezing has occurred on the contacts A11 and A12.

If the relay device 10 is not switched between the open and closed modes regardless of the fact that the controller 20 has performed control for switching the relay device 10 between the open and closed modes, the controller 20 may estimate that freezing has occurred on the contacts A11 and A12. The determination of whether the relay device 10 is switched between the open and closed modes can be performed based on detection values of, for example, voltage and electric current of the electric power line 222. In addition to the above-described case, the controller 20 may perform the estimation related to whether freezing has occurred on the contacts A11 and A12 based on additional information indicating whether the temperature detected by the first temperature sensor 18 or the second temperature sensor 30 is a temperature that causes freezing to occur.

The controller 20 further has a function for dealing with freezing by performing first application of electric current to the driving mechanism 16 (i.e., application of electric current to the first coil 161 and the second coil 162) if the controller 20 estimates that the freezing has occurred on the contacts A11 and A12. The first application of electric current involves applying electric current to the driving mechanism 16 to generate a driving force in a direction in which the contacts A11 and A12 are not switched between the open and closed modes. With the first application of electric current, a relatively large amount of electric current can be applied without switching the contacts A11 and A12 between the open and closed modes, thereby generating a large amount of heat (Joule's heat) in the driving mechanism 16. Consequently, by heating the contacts A11 and A12 using the generated heat, unfreezing can be performed quickly.

In one example, when the contacts A11 and A12 are in the open mode, the first application of electric current corresponds to application of electric current to the second coil 162 to generate a driving force in the direction for separating the contacts A11 and A12 from each other. When the contacts A11 and A12 are in the closed mode, the first application of electric current corresponds to application of electric current to the first coil 161 to generate a driving force in the direction for bringing the contacts A11 and A12 adjacent to each other. The first application of electric current may involve applying electric current concurrently to the first coil 161 and the second coil 162. In this case, driving forces acting in the direction for separating the contacts A11 and A12 from each other and in direction for bringing the contacts A11 and A12 adjacent to each other are both generated in the driving mechanism 16. In one example, when the contacts A11 and A12 are in the open mode, a driving force acting in a direction for not switching between the open and closed modes (i.e., in the direction for separating the contacts A11 and A12 from each other) is generated. When the contacts A11 and A12 are in the closed mode, a driving force acting in a direction for not switching between the open and closed modes (i.e., in the direction for bringing the contacts A11 and A12 adjacent to each other) is generated. Therefore, the contacts A11 and A12 are not switched between the open and closed modes even when a large amount of electric current is applied thereto. If there is provided a drive circuit capable of applying electric current in the reverse direction to the first coil 161 or the second coil 162, the controller 20 may perform the first application of electric current involving applying electric current in the reverse direction to generate a driving force in the direction for not switching between the open and closed modes.

Unfreezing Process

Figure 3:
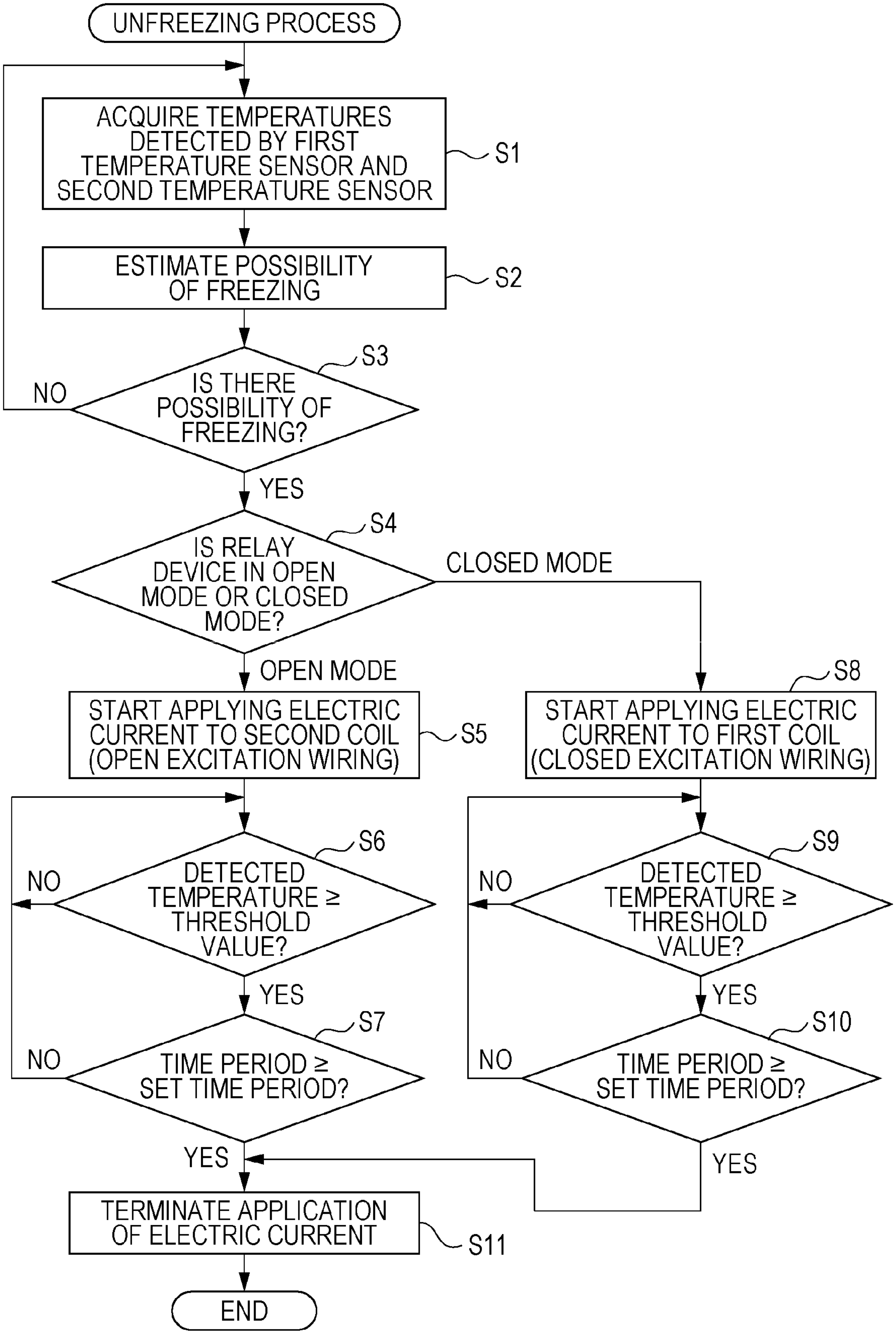
FIG. 3 is a flowchart illustrating an unfreezing process executed by a controller.

The following description relates to an unfreezing process executed by the controller 20. FIG. 3 is a flowchart illustrating the unfreezing process executed by the controller 20. The unfreezing process may be executed constantly while the controller 20 is in operation, or may be executed while the controller 20 is in operation during the cold season in which freezing may occur. Alternatively, if the timing at which the relay device 10 switches between the open and closed modes is predictable, the unfreezing process may be executed immediately before this timing. For example, if the relay device 10 is configured to switch to the closed mode immediately upon system activation of the vehicle 200, the controller 20 may execute the unfreezing process during a period from when the system is activated to when the relay device 10 switches to the closed mode. As another alternative, if there is a high possibility in which the relay device 10 may switch to the closed mode at the time of reactivation after an idling-stop mode of the engine, the controller 20 may execute the unfreezing process during the period from the idling-stop mode to the reactivation of the engine.

When the unfreezing process commences, the controller 20 acquires temperatures detected by the first temperature sensor 18 and the second temperature sensor 30 in step S1, and estimates a possibility of freezing occurring on the contacts A11 and A12 based on these detected temperatures in step S2. Then, the controller 20 determines whether there is a possibility of freezing in step S3. If there is no possibility, the controller 20 repeats the process from step S1 to step S3.

In contrast, if the controller 20 determines that there is a possibility of freezing, the controller 20 determines whether the relay device 10 is in the open or closed mode in step S4. If the relay device 10 is in the open mode, the controller 20 starts to apply electric current to the second coil (open excitation wiring) 162 in step S5 to generate a driving force in the direction for switching to the open mode. Subsequently, the controller 20 determines whether the temperature detected by the first temperature sensor 18 has exceeded a threshold value in step S6. If the determination result indicates "NO", the controller 20 repeats the determination process in step S6. The threshold value is set to a value that enables unfreezing. When the determination result obtained in step S6 indicates "YES", the controller 20 starts to perform a timekeeping process and determines in step S7 whether a time period in which the temperature has exceeded the threshold value is longer than or equal to a set time period. If the obtained result indicates "NO", the controller 20 returns to step S6.

When the controller 20 determines in step S6 that the detected temperature is greater than or equal to the threshold value and determines in step S7 that the time period in which the temperature is greater than or equal to the threshold value is longer than or equal to the set time period, the controller 20 terminates the application of electric current in step S11. Even when freezing has occurred on the contacts A11 and A12 as result of step S6 and step S7, it can be determined quickly with high accuracy that unfreezing has been completed using the heat of the second coil 162.

In contrast, if the determination result obtained in step S4 indicates that the relay device 10 is in the closed mode, the controller 20 starts to apply electric current to the first coil (closed excitation wiring) 161 in step S8 to generate a driving force in the direction for switching to the closed mode. Subsequently, the controller 20 determines whether the temperature detected by the first temperature sensor 18 has exceeded a threshold value in step S9. If the determination result indicates "NO", the controller 20 repeats the determination process in step S9. The threshold value is set to a value that enables unfreezing. When the determination result obtained in step S9 indicates "YES", the controller 20 starts to perform a timekeeping process and determines in step S10 whether a time period in which the temperature has exceeded the threshold value is longer than or equal to a set time period. If the obtained result indicates "NO", the controller 20 returns to step S9.

When the controller 20 determines in step S9 that the detected temperature is greater than or equal to the threshold value and determines in step S10 that the time period in which the temperature is greater than or equal to the threshold value is longer than or equal to the set time period, the controller 20 terminates the application of electric current in step S11. Even when freezing has occurred on the contacts A11 and A12 as result of step S9 and step S10, it can be determined quickly with high accuracy that unfreezing has been completed using the heat of the first coil 161.

When the application of electric current is completed in step S11, the controller 20 ends the unfreezing process. Alternatively, if the unfreezing process is to be executed continuously for a certain time period, the controller 20 repeatedly executes the above-described unfreezing process until the aforementioned time period elapses.

A program of the above-described unfreezing process is stored in a non-transitory computer readable medium, such as the storage unit 22 of the controller 20. The controller 20 may be configured to read a program stored in a portable non-transitory computer readable medium and execute the program. The aforementioned portable non-transitory computer readable medium may store the program of the above-described unfreezing process.

Accordingly, in the relay system 100 according to this embodiment, when the controller 20 estimates that there is a possibility of freezing occurring on the contacts A11 and A12 of the relay device 10, the controller 20 commences first application of electric current to the driving mechanism 16. The first application of electric current involves applying electric current to the driving mechanism 16 to generate a driving force in the direction in which the contacts A11 and A12 are not switched between the open and closed modes. Thus, the first application of electric current can be performed with a relatively large amount of electric current. With the first application of electric current, a large amount of heat can be generated from the driving mechanism 16. Consequently, unfreezing can be performed quickly on the contacts A11 and A12. Furthermore, even when a large amount of electric current is applied, a driving force acting in the direction for not switching between the open and closed modes is generated in the driving mechanism 16, so that the contacts A11 and A12 are not switched between the open and closed modes when the unfreezing of the contacts A11 and A12 is completed. Accordingly, the unfreezing timing is less likely to be limited, and a reduced lifespan of the contacts A11 and A12 can be suppressed.

As an alternative to the above embodiment in which the controller 20 is configured to perform the freezing-related estimation and execute the first application of electric current, the controller 20 may be configured to not perform the freezing-related estimation. For example, when freezing occurs, a request for the first application of electric current may be transmitted to the controller 20 from an external source, and the controller 20 may be configured to commence the first application of electric current based on the request.

The relay system 100 according to this embodiment further includes the first temperature sensor 18 that detects the temperature inside the housing 19, and the controller 20 terminates the first application of electric current based on the temperature detected by the first temperature sensor 18. Accordingly, with the first application of electric current, the reliability of the unfreezing process performed on the contacts A11 and A12 can be enhanced.

The relay system 100 according to this embodiment further includes the second temperature sensor 30 that detects the ambient temperature. The controller 20 performs the estimation related to whether freezing has occurred on the contacts A11 and A12 based on the temperature detected by the first temperature sensor 18 and the temperature detected by the second temperature sensor 30. Normally, condensation occurs before freezing, and occurs mainly due to a temperature difference between the air temperature and the temperature of a target object. Therefore, in accordance with the estimation based on the two detected temperatures, the controller 20 can estimate with high accuracy whether condensation has occurred on the contacts A11 and A12, whereby the controller 20 can estimate with high accuracy whether freezing has occurred on the contacts A11 and A12. This highly-accurate estimation can reduce wasteful power consumption occurring as a result of the first application of electric current being executed even when there is no freezing, and can reduce a missed opportunity of dealing with freezing even when such freezing has occurred.

Accordingly, a less-wasteful relay system 100 with fewer malfunctions in the cold season can be achieved.

Furthermore, according to this embodiment, the relay device 10 includes the first coil 161 that generates a driving force for switching the contacts A11 and A12 from the open mode to the closed mode and the second coil 162 that generates a driving force for switching the contacts A11 and A12 from the closed mode to the open mode. The above-described first application of electric current involves applying electric current to the second coil 162 when the contacts A11 and A12 are in the open mode. Thus, a special drive circuit for performing the first application of electric current is not to be added, and the configuration in which the controller 20 executes the first application of electric current can be readily achieved.

Furthermore, in this embodiment, as the above-described first application of electric current, the controller 20 may employ a method involving applying electric current concurrently to the first coil 161 and the second coil 162. With the application of electric current according to this method, heat can be generated from the driving mechanism 16 by applying electric current thereto in a similar manner without switching the contacts A11 and A12 between the open and closed modes when the contacts A11 and A12 are in the open mode or the closed mode. Therefore, the controller 20 can omit a process for confirming the open or closed mode before executing the first application of electric current. Furthermore, with the application of electric current according to this method, the overall amount of electric current to be applied can be increased relative to a case where electric current is applied to a single coil. Accordingly, freezing can be dealt with more quickly.

The embodiment of the disclosure has been described above. However, the embodiment of the disclosure is not limited to that described above. For example, as an alternative to the above embodiment in which the relay system is equipped in a vehicle, the relay system according to the embodiment of the disclosure is not limited to a vehicle and may be incorporated in any of various apparatuses. For example, the relay system may be incorporated in an industrial machine. Furthermore, as an alternative to the above embodiment in which the relay device is a latching relay, the relay device may be configured to switch between the open and closed modes by applying electric current to the coils and cancelling the application of the electric current to the coils. In this case, the first application of electric current may involve applying electric current flowing in the reverse direction. With such first application of electric current, freezing can be dealt with by applying a large amount of electric current to the coils without switching between the open and closed modes of the relay device set in the open mode or the closed mode as a result of cancelling the application of electric current to the coils. Other details described in the embodiment are appropriately modifiable so long as they do not depart from the scope of the embodiment of the disclosure.

According to the embodiment of the disclosure, by commencing the first application of electric current, a large amount of heat can be generated from the driving mechanism without switching the contacts between the open and closed modes. Therefore, freezing occurring on the contacts can be quickly dealt with when such freezing occurs, while a reduced lifespan of the contacts can be suppressed.

The relay system 100 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the relay system 100 including the relay device 10, the controller 20, and the second temperature sensor 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A relay system comprising:

a relay device comprising a contact and a driving mechanism configured to switch the contact between an open mode and a closed mode; and a controller configured to control the relay device, wherein the controller is configured to, when freezing occurs on the contact, commence first application of electric current to the driving mechanism to generate a driving force acting in a direction in which the contact is not switched between the open mode and the closed mode.

2. The relay system according to claim 1, wherein the relay device further comprises:

a housing configured to accommodate the contact and the driving mechanism; and a first temperature sensor configured to detect a temperature inside the housing, and wherein the controller is configured to terminate the first application of electric current based on the temperature detected by the first temperature sensor.

3. The relay system according to claim 1, wherein the relay device further comprises:

a housing configured to accommodate the contact and the driving mechanism; and a first temperature sensor configured to detect a temperature inside the housing, wherein the relay system further comprises:

a second temperature sensor configured to detect an ambient temperature, and wherein the controller is configured to perform an estimation related to whether the freezing has occurred on the contact based on the temperature detected by the first temperature sensor and the temperature detected by the second temperature sensor.

4. The relay system according to claim 1, wherein the relay device comprises a first coil configured to generate a driving force for switching the contact from the open mode to the closed mode and a second coil configured to generate a driving force for switching the contact from the closed mode to the open mode, and wherein the first application of the electric current comprises applying the electric current to the second coil when the contact is in the open mode.

5. The relay system according to claim 1, wherein the relay device comprises a first coil configured to generate a driving force for switching the contact from the open mode to the closed mode and a second coil configured to generate a driving force for switching the contact from the closed mode to the open mode, and wherein the first application of the electric current comprises applying the electric current concurrently to the first coil and the second coil.

6. A relay system comprising:

a relay device comprising a contact, and a driving mechanism including a coil and configured to switch the contact between an open mode and a closed mode; and circuitry configured to control the relay device, and when freezing occurs on the contact, commence first application of electric current to the coil of the driving mechanism to generate a driving force acting in a direction in which the contact is not switched between the open mode and the closed mode.

* * * * *